(12) United States Patent
Takata et al.

(10) Patent No.: US 7,684,091 B2
(45) Date of Patent: Mar. 23, 2010

(54) IMAGE READING APPARATUS AND IMAGE READING METHOD

(75) Inventors: Sohichi Takata, Kitakatsuragi-gun Nara (JP); Yoshitaka Okahashi, Nara (JP); Kohsuke Harada, Nara (JP); Takao Horiuchi, Nara (JP); Kenji Tanaka, Kyoto (JP); Kouji Yamaji, Kyoto (JP)

(73) Assignee: Sharp Kabushiki Kaisha, Osaka-Shi (JP)

( * ) Notice: Subject to any disclaimer, the term of this patent is extended or adjusted under 35 U.S.C. 154(b) by 1070 days.

(21) Appl. No.: 11/356,662

(22) Filed: Feb. 16, 2006

(65) Prior Publication Data

US 2006/0181747 A1    Aug. 17, 2006

(30) Foreign Application Priority Data

Feb. 17, 2005    (JP)    ............................. 2005-040022

(51) Int. Cl.
    *H04N 1/04* (2006.01)
(52) U.S. Cl. .................. 358/474; 358/498; 358/497; 358/496; 358/452; 399/367; 399/374; 271/110; 271/126; 382/232
(58) Field of Classification Search ................ 358/474, 358/498, 497, 496, 449, 451, 452; 399/367, 399/374, 396; 271/110, 126, 152, 264; 382/232
    See application file for complete search history.

(56) References Cited

U.S. PATENT DOCUMENTS

| | | | | |
|---|---|---|---|---|
| 4,743,974 A | * | 5/1988 | Lockwood | ................... 358/494 |
| 5,716,046 A | * | 2/1998 | Katamoto et al. | .......... 271/3.08 |
| 6,151,478 A | * | 11/2000 | Katsuta et al. | ............... 399/372 |
| 6,185,403 B1 | * | 2/2001 | Toyoshima et al. | ......... 399/365 |
| 6,233,068 B1 | * | 5/2001 | Kondo | ........................ 358/498 |
| 6,285,853 B1 | * | 9/2001 | Sano | ........................... 399/374 |
| 6,318,253 B1 | * | 11/2001 | Ohno | ........................... 101/33 |
| 6,600,579 B1 | * | 7/2003 | Kumagai et al. | ............. 358/474 |
| 6,743,974 B2 | * | 6/2004 | Wada et al. | .................. 136/255 |
| 2004/0027621 A1 | * | 2/2004 | Masuda et al. | .............. 358/474 |

(Continued)

FOREIGN PATENT DOCUMENTS

JP    4-192662 A    7/1992

(Continued)

*Primary Examiner*—Negussie Worku
(74) *Attorney, Agent, or Firm*—Edwards Angell Palmer & Dodge LLP; David G. Conlin; Catherine J. Toppin

(57) ABSTRACT

Reference images on the respective surfaces of a reference document transported on a transportation path are read out by a first image reading section and a second image reading section, respectively. As a result a first reference readout image and a second reference readout image are acquired. in accordance with the difference between the changes in the sub-scanning direction in the first reference readout image and the changes in the sub-scanning direction in the second reference readout image, the reading cycle of the first image reading section X1 and the reading cycle of the second image reading section X2 are set. This makes it possible to equalize the magnifications of the respective images on the front and back sides of the document, even if the speeds of the document at the times of passing through readout positions for the front and back sides change over time, on account of the wear of a transportation roller.

9 Claims, 6 Drawing Sheets

U.S. PATENT DOCUMENTS

| | | | |
|---|---|---|---|
| 2004/0217541 A1* | 11/2004 | Horio | 271/121 |
| 2005/0158091 A1* | 7/2005 | Oya et al. | 399/367 |
| 2006/0066923 A1* | 3/2006 | Magata et al. | 358/498 |
| 2007/0109610 A1* | 5/2007 | Sasaki | 358/474 |
| 2008/0106773 A1* | 5/2008 | Akiyama | 358/496 |
| 2008/0225355 A1* | 9/2008 | Kagami | 358/496 |

FOREIGN PATENT DOCUMENTS

| | | |
|---|---|---|
| JP | 10-190989 A | 7/1998 |
| JP | 11-024525 | 1/1999 |
| JP | 2000-115459 A | 4/2000 |
| JP | 2000-184134 | 6/2000 |
| JP | 2003-264671 | 9/2003 |
| JP | 2005-210184 | 8/2005 |

* cited by examiner

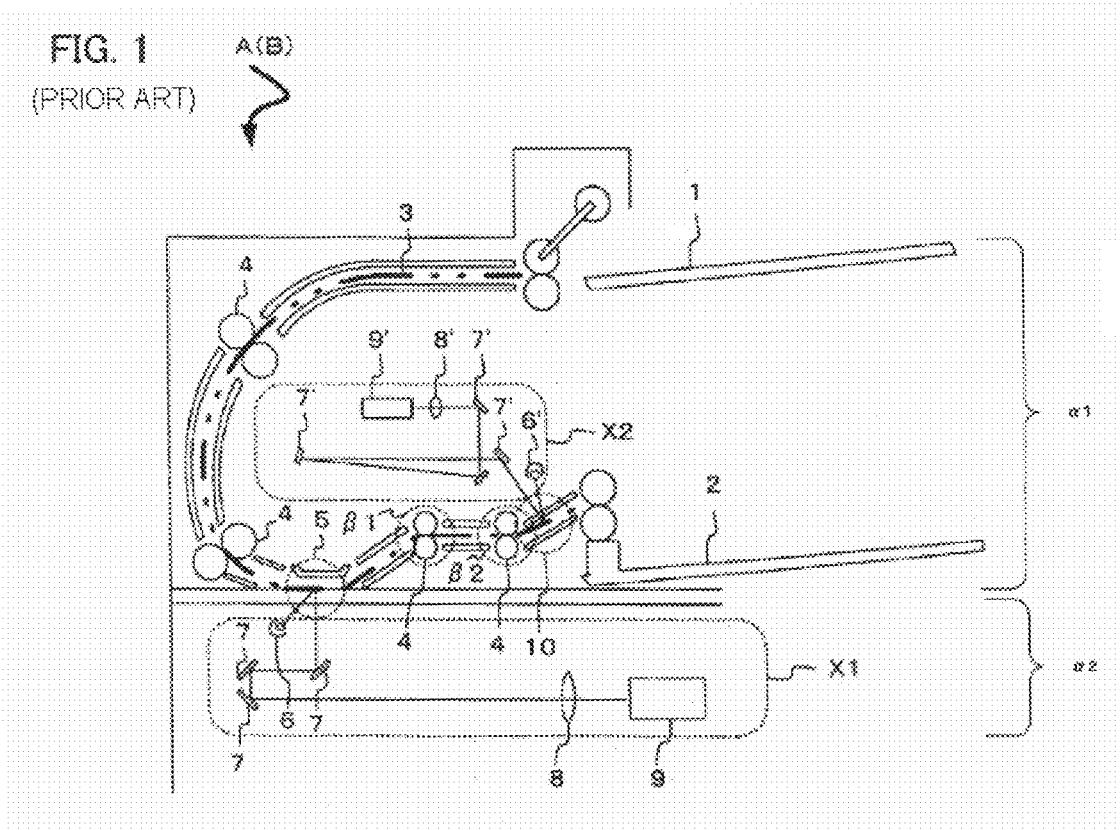

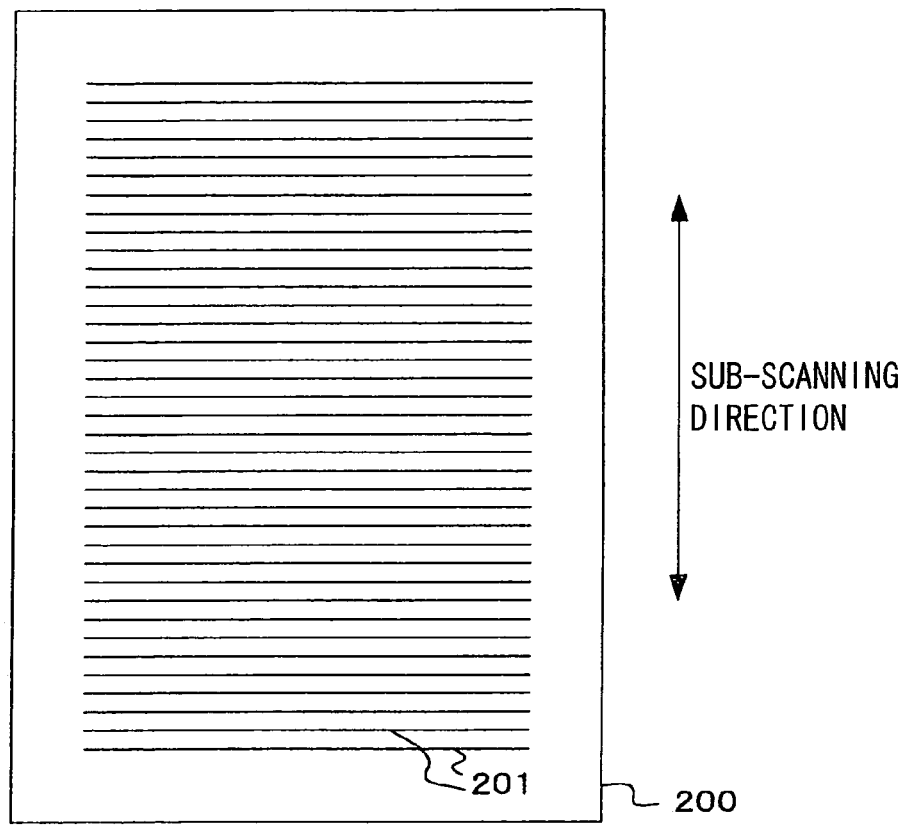
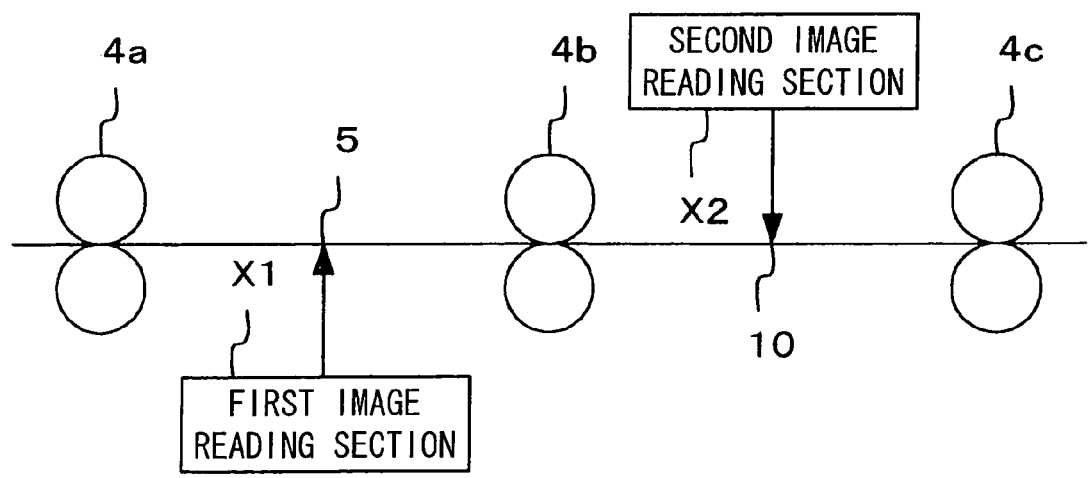

IMAGE READING APPARATUS AND IMAGE READING METHOD

This Nonprovisional application claims priority under 35 U.S.C. § 119(a) on Patent Application No. 40022/2005 filed in Japan on Feb. 17, 2005, the entire contents of which are hereby incorporated by reference.

FIELD OF THE INVENTION

The present invention relates to an image reading apparatus that reads out image information formed on the both sides of a document, and particularly relates to an image forming apparatus capable of setting a reading cycle (reading speed) of each reading section that reads out each of the images on the respective sides.

BACKGROUND OF THE INVENTION

As described in, for example, Japanese Laid-Open Patent Application No. 2000-184134 (published on Jun. 30, 2000) and Japanese Laid-Open Patent Application No. 2003-264671 (published on Sep. 19, 2003), there have been image reading apparatuses that can read image information from the both sides of a document, while transporting the document. FIG. 1 is a schematic view of such a conventional image reading apparatus (scanner B) that can read out images from the both sides. Referring to FIG. 1, the outline of the conventional image reading apparatus that can read out images from the both sides will be described.

As shown in the figure, the scanner B of the conventional art includes an ADF device α1 and a front-side optical section α2. The ADF device α1 includes a document tray 1 and a paper output tray 2. Between the document tray 1 and the paper output tray 2, a predetermined transportation path 3 is provided for transporting a document to the paper output tray 2. Along the transportation path 3, transportation rollers 4 (an example of a transportation section) are formed at different positions along the transportation path 3. As the transportation rollers 4 are driven so as to rotate, the document from which an image is read out is transported along the transportation path 3.

In the front-side optical section α2, a first image reading section X1 is formed for reading an image from the front side (one side) of the document. The first image reading section X1 reads out the image, when the document which is transported along the transportation path 3 passes through a predetermined first readout position 5.

The first image reading section X1 includes members such as an exposure device 6, an optical guiding mirror 7, a lens 8, and a CCD 9. When the document passes through the first readout position 5, the exposure device 6 emits image reading light onto the document. The image reading light is reflected on the document, and is guided to the lens 8 by the optical guiding mirror 7. The image reading light provides an image on the CCD 9, on account of the lens 8. The image reading light is converted into an electric signal by the CCD 9, and supplied to an image processing control section (see FIG. 4, described later). As a result, the image information on the front side of the document is read out by the first image reading section.

In the meantime, the ADF device α1 is provided with a second image reading section X2 that reads out an image from the back side (the other side) of the document. The second image reading section X2 reads out the image from the back side of the document, when the document which is transported along the transportation path 3 passes through a second readout position 10 which is downstream of the first readout position 5, in the document transport direction. Being similar to the first image reading section X1, the second image reading section X2 includes members such as an exposure device 6', an optical guiding mirror 7', a lens 8', and a CCD 9'.

On the CCD 9', an image is provided by image reading light which irradiates the back side of the document. The image reading light is converted into an electric signal by the CCD 9', and is supplied to the image processing control section. As a result, the image information on the back side of the document is read out by the second image reading section X2. On the transportation path 3, a bent portion β1 that protrudes upward and a bent portion β2 that protrudes downward are formed between the first readout position 5 and the second readout position 10.

The first readout position 5 and the second readout position 10 cannot be overlapped with one another on the transportation path 3. This is because, if these positions are provided at the same location, the image reading light for reading out an image from one side of the document enters the image reading section that reads out an image from the other side, and hence the image reading light becomes inaccurate.

As shown in FIG. 1, the transportation rollers 4 (an example of the transportation section) are provided at different positions, including a position upstream of the first readout position 5 in terms of the transportation direction, and a position downstream of the second readout position 10 in terms of the transportation direction. The transportation rollers 4 serially transport the documents along the transportation path 3. While the document is transported, the rotation speed of each transportation roller 4 is controlled based on the transportation speed of the document, which is set by the image processing control section. (It is noted that the transportation speed is worked out by multiplying the rotation speed by the diameter of the roller.) The lower the position of the transportation roller 4 in terms of the transportation direction is, the higher the transportation speed of the transportation roller 4 is. This prevents the document from being warped while being transported.

Therefore, the speed of the document passing through the first readout position 5 is lower than the speed of the document passing through the second readout position 10.

The reading cycle (reading speed) of the CCD 9 of the first image reading section X1 and the reading cycle (reading speed) of the CCD 9' of the second image reading section X2 are set in accordance with the speed of the document at the time of passing through the first readout position 5 and the speed of the document at the time of passing through the second readout position 10, respectively. For example, in a case where the ratio between the speed of the document passing through the first readout position 5 and the speed of the document passing through the second readout position 10 is 1:1.05, the ratio between the reading cycle of the CCD 9 and the reading cycle of the CCD 9' is also set at 1:1.05.

In this manner, the reading cycles of the CCDs 9 and 9' are set in accordance with the passing speeds at the respective readout positions. In other words, the ratio between the reading cycle of the CCD 9 and the reading cycle of the CCD 9' is set so as to be identical with the ratio between the passing speed at the first readout position 5 and the passing speed at the second readout position 10. This causes the magnification of the image read out from the front side and the magnification of the image read out from the back side to be identical with each other. In other words, the arrangement above prevents a stored image, which has been read out from one side, from being larger or smaller in size as compared to a stored image read out from the other side.

However, for example, as the transportation roller 4 is worn down over time, the diameter of the roller changes. If the diameter of the roller changes, the ratio between the passing speeds at the respective readout positions also changes even if the settings of the transportation speeds are not varied. As a result, the ratio between the passing speeds does not correspond to the ratio between the reading cycles of the respective CCDs that read the image information from the front side and the back side of the document. On this account, the magnification of the image read out from the front side becomes different from the magnification of the image read out from the back side.

SUMMARY OF THE INVENTION

The present invention was done to solve the above-described problem. The objective of the present invention is therefore to provide an image reading apparatus that can keep the magnification of an image read out from the front side of a document and the magnification of an image read out from the back side of the document to be identical with each other, even if the passing speeds of the document at readout positions for the front and back sides change over time.

To achieve the objective above, the image reading apparatus of the present invention includes: a transportation section that transports a document on a predetermined transportation path; a first image reading section that reads out an image from one surface of the document transported on the transportation path; a second image reading section that reads out an image from the other surface of the document, at a position which is lower, in terms of a document transportation direction, than an image readout position where the image is read out by the first image reading section; a speed detection section that detects a document transportation speed when the first image reading section reads out the image and a document transportation speed when the second image reading section reads out the image; and a reading cycle setting section that sets a reading cycle, in the document transportation direction, of the first image reading section and/or the second image reading section, in accordance with a result of detection by the speed detection section.

According to the arrangement above, in a case where, for example, the transportation section wears over time, the changes in the document transportation speed on account of the wear are detected by the speed detection section that detects the document transportation speed when the first image reading section reads out the image and the document transportation speed when the second image reading section reads out the image. In accordance with the result of the detection by the speed detection section, the reading cycle of the first image reading section and/or the second image reading section in the document transportation direction is set. That is, the reading cycle setting section sets (changes the setting of) the reading cycle of at least one of the first and second image reading sections, in such a manner as to reduce the relative difference between the magnification of the image read out by the first image reading section and the magnification of the image read out by the second image reading section. This allows the magnification of the image read out by the first image reading section and the magnification of the image read out by the second image reading section to be identical with each other, even if, for example, the transportation section wears over time.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 1 shows the outline of an image reading apparatus (scanner A) of an embodiment of the present invention.

FIG. 2 shows a reference document on which a reference image to be read out by the image reading apparatus of the embodiment of the present invention is formed.

FIG. 3 schematically shows the relationship of a transportation path of the document, transportation rollers, and readout positions, in the image reading apparatus of the embodiment of the present invention.

DESCRIPTION OF THE EMBODIMENTS

Figure 4:
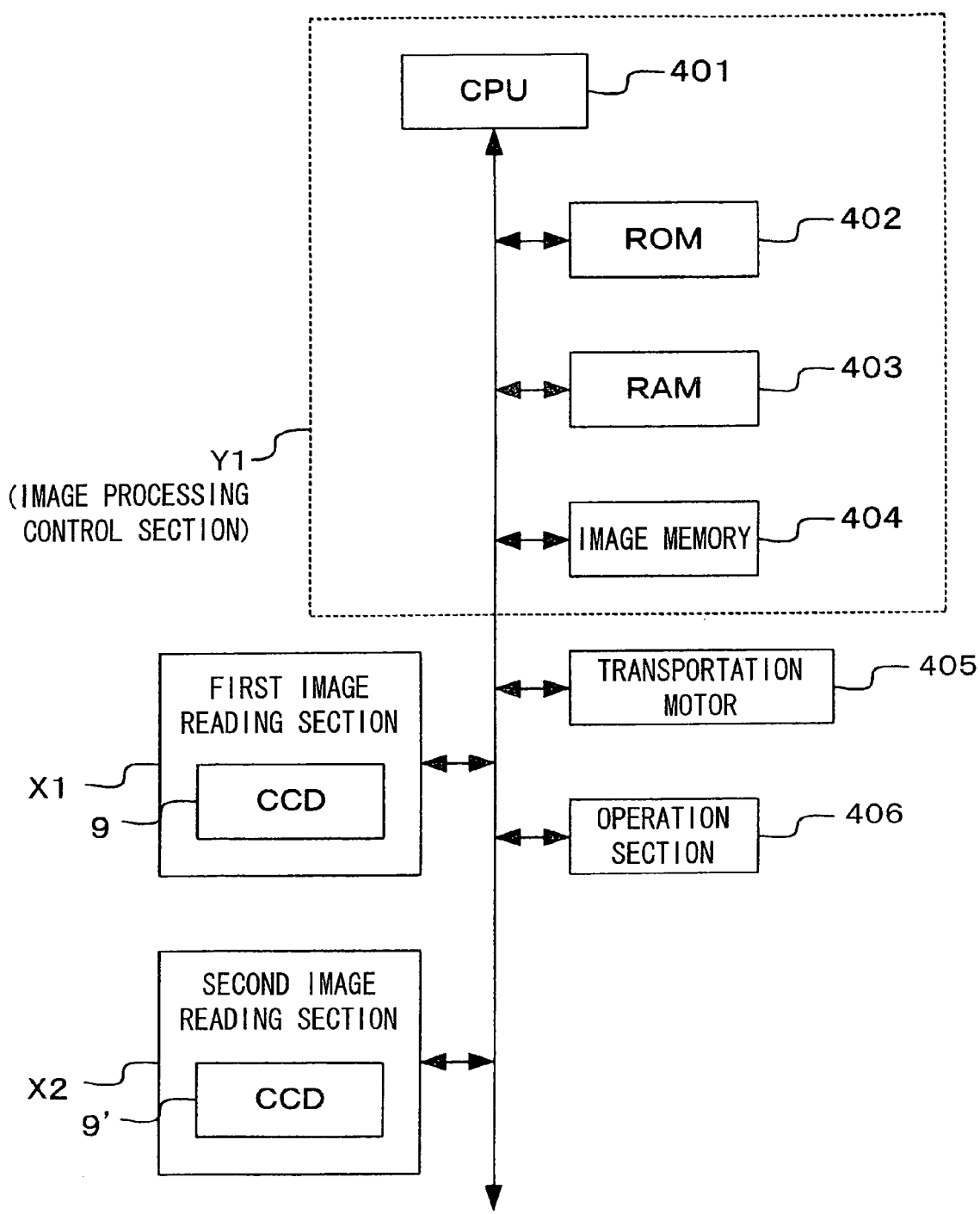
FIG. 4 is a block diagram showing an essential part of the image reading apparatus of the embodiment of the present invention.

The following will describe an embodiment of the present invention. It is noted that the following embodiment is an example to concretize the present invention. Therefore the technical scope of the present invention is not limited to this embodiment.

In the embodiment, members identical with those described in the background are given the same numbers, so that the descriptions are omitted for the sake of convenience.

(1-1) Outline of Scanner A of Embodiment of Present Invention

The scanner A (image reading apparatus) of the embodiment, which is shown in FIG. 1, has the following two characteristic functions.

The first function is to obtain (i) a first reference readout image which is read out by a first image reading section X1 from a reference document (see FIG. 2) transported on a transportation path 3, and (ii) a second reference readout image read out by a second image reading section X2.

The second function is to set reading cycles of a CCD 9 and a CCD 9', based on the comparison between the first and second reference readout images. The CCD 9 is provided in the first image reading section X1, while the CCD 9' is provided in the second image reading section X2.

On account of these two functions, it is possible to set (change) the reading cycles of the CCD 9 and the CCD 9', in the following case: the diameter of one of the transportation rollers 4 changes because of, for example, wear over time, and this results in the change in at least one of the passing speeds at the first readout position 5 where the image information of the document is read out by the first image reading section X1 and at the second readout position 10 where the image information is read out by the second image reading section X2. This allows the magnification of the image read out (from the front side) by the first image reading section X1 and the magnification of the image read out (from the back side) by the second image reading section X2 to be identical with each other.

Apart from the functions above, the functions of the scanner A are identical with those of the scanner B of the conventional art, e.g. the first and second image reading sections X1 and X2 of the scanner A are identical with those of the scanner B. On this account, the overall description of the scanner A is omitted, except for the aforesaid functions.

(1-2) Reference Image on Reference Document

FIG. 2 shows an example of a reference document 200. On two surfaces of the reference document 200, reference images for obtaining first and second readout images are formed, respectively. Referring to FIG. 2, the following will describe the reference document 200 on which the reference images are formed.

On the reference document 200 shown in FIG. 2, a reference image is formed. In this reference image, black lines 201 (image) are drawn at regular (predetermined) intervals in a sub-scanning direction which is in parallel with the direction to transport the document on the transportation path 3. In other words, on the reference document 200, a striped reference image, in which white portions and black portions alternate regularly in the sub-scanning direction, is formed.

Therefore, the first reference readout image and the second reference readout image, which are read out from the reference document 200 by the first and second image reading sections X1 and X2, are also images in which white portions and black portions alternate regularly. Note that, the intervals of the black portions are determined by the passing speed of the document at the first readout position 5 and the passing speed of the document at the second readout position 10. Therefore, the intervals between the black portions can be regarded as the passing speeds of the document.

(1-3) Method of Adjusting Reading Cycle of CCD

Figure 6:
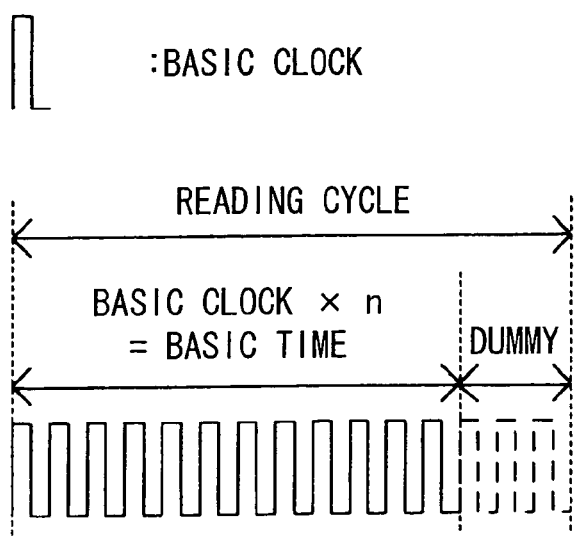
FIG. 6 is a conceptual diagram for illustrating a method of adjusting a reading cycle in the embodiment of the present invention.

FIG. 6 is a conceptual diagram for illustrating a method of adjusting a reading cycle of the present embodiment. In the figure, the cycle of a basic clock corresponds to a time required for reading one pixel by the CCD. Therefore, the reading cycle for reading, by the CCD, the pixels on one line in the main scanning direction requires a time worked out by multiplying the basic clock by the number n of the pixels on one line in the main scanning direction (hereinafter, the time will be referred to as basic time). The basic time, however, is not commonly used as the reading cycle. The reading cycle is usually the sum of the basic time and a margin termed dummy. The dummy is a time during which the image reading is not carried out. By adjusting the length of the dummy, it is possible to change the length of the reading cycle, without affecting the image reading.

(1-4) Positional Relation of Transportation Path 3, Transportation Rollers 4, and First and Second Readout Positions 5 and 10 in Scanner of Embodiment of Present Invention FIG. 3 outlines the relation of the transportation path 3, the transportation rollers 4a-4c, and the readout positions (first readout position 5 and second readout position 6), in the scanner A of the present embodiment. The transportation rollers 4a-4c are included in the transportation rollers 4 shown in FIG. 1, and are related to the transportation of the document at the time of passing through the first readout position 5 and at the time of passing through the second readout position 10. The transportation rollers 4a are provided at the most upstream point on the transportation path 3, in terms of the direction of transportation of the document. The transportation rollers 4c are provided at the most downstream point on the transportation path 3. The transportation rollers 4b are provided between the transportation rollers 4a and 4c.

The following description is on the following presupposition: the first readout position 5 locates between the position where the transportation rollers 4a are provided and the position where the transportation rollers 4b are provided, and the second readout position 10 locates between the position where the transportation rollers 4b are provided and the position where the transportation rollers 4c are provided.

When the document reaches the first readout position 5, the document is transported only by the transportation rollers 4a. When the document has just passed through the first readout position 5, the document is transported by the transportation rollers 4b and 4c. When the document reaches the second readout position 10, the document is transported by the transportation rollers 4a and 4b. When the document has just passed through the second readout position 10, the document is transported only by the transportation rollers 4c. Therefore, the average passing speed of the document passing through the first and second readout positions 5 and 10 is determined by the transportation speeds of the respective transportation rollers 4a-4c. The transportation speed of each pair of the rollers is determined independently.

By the way, the transportation speed of each pair of the rollers is not necessarily determined independently. As described below, the transportation rollers 4a-4c may be driven by one transportation roller (405, see FIG. 4). In this case, the transportation speeds cannot be determined independently.

(1-5) Essential Part of Scanner A of Embodiment of Present Invention

FIG. 4 is a block diagram showing the essential part of the scanner A of the present embodiment. Referring to this figure, the following will describe the essential part of the scanner A. The scanner A subjects images, which are read out by the first and second image reading sections X1 and X2, to various processes, and stores the images. Also, the scanner A includes an image processing control section Y1 that carries out the overall control of the scanner A.

The image processing control section Y1 includes members such as: a CPU 401 that is a computing section; a ROM 402 that stores a predetermined control program for controlling the scanner A; a RAM 403 which is a non-volatile memory and is a working space of the CPU 401; and an image memory 404 that stores an obtained image.

The first and second image reading sections X1 and X2 are connected to the image processing control section Y1. Therefore, images read out by the respective image reading sections X1 and X2 are supplied to the image processing control section Y1. The image processing control section Y1 controls the reading cycle of the CCD 9 included in the first image reading section X1 and the reading cycle of the CCD 9' included in the second image reading section X2.

The document is accelerated while being transported on the transportation path 3. In accordance with the ratio between (i) the average passing speed when the document passes through the first readout position 5 and (ii) the average passing speed when the document passes through the second readout position 10, the ratio between the reading cycle of the CCD 9 and the reading cycle of the CCD 9' is determined. Based on the ratio between the reading cycles, the reading cycles are actually set.

The image processing control section Y1 is connected to a transportation motor 405 that drives the transportation rollers 4a-4c. The image processing control section Y1 controls the drive of the transportation motor 405, in accordance with the predetermined rotation speed. By this transportation motor 405, the transportation rollers 4a-4c are driven.

On the outer surface of the scanner A, an operation section 406 is provided for allowing the user to input instructions. The control section 406 is connected to the image processing control section Y1. By inputting instructions using the operation section 406, the user can request, for example, the scanner A to read out an image from the document.

The scanner A can be switched between (i) a setting mode for setting the transportation speeds of the transportation rollers 4a-4c and (ii) a normal mode for performing normal image reading. The switching between the modes is also instructed by the user, through the input into the operation section 406.

Figure 5:
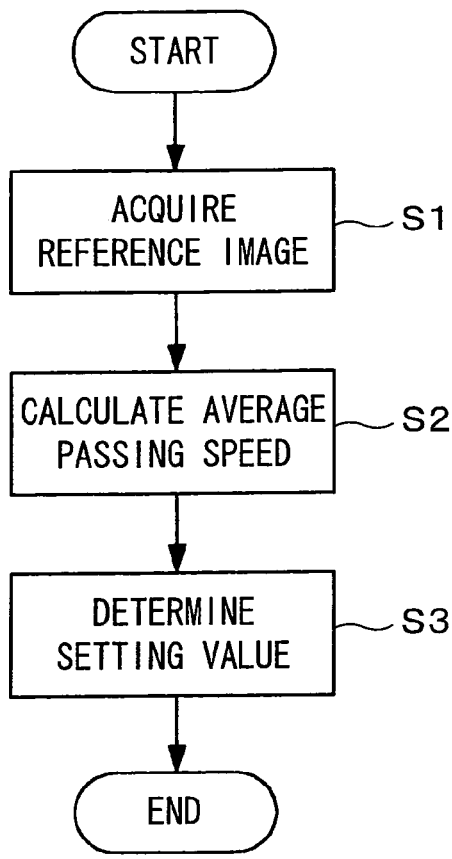
FIG. 5 is a flowchart showing the steps carried out by the image reading apparatus of the embodiment of the present invention.

(1-6) How Transportation Speed is Concretely Set by Image Processing Control Section FIG. 5 is a flowchart showing the steps of how the image processing control section Y1 of the scanner A of the present embodiment sets the reading cycle of the CCD 9 of the first image reading section X1 and the reading cycle of the CCD 9' of the image reading section X2. Referring to the flowchart in FIG. 5, the following will describe the steps of how the image processing control section Y1 sets the reading cycles, in a detailed manner. It is noted that S1, S2, and the like in FIG. 5 indicates the numbers assigned to steps. Once a predetermined mode switch instruction input is supplied from the operation section 406 (see FIG. 4), the steps are serially executed from the step S1.

In the step S1, the reference images (first and second reference readout images), which are read out from the reference document 200 (see FIG. 2) by the first and second image reading sections X1 and X2, are supplied to the image processing control section Y1, for example. The information of the reference images is supplied to (and stored in) the RAM 403. It is noted that the image processing control section Y1 is an example of a reference image obtaining section.

In the step S2 subsequent to the step S1, the CPU 401 performs predetermined pattern recognition and analysis of the first and second reference readout images. As a result, the intervals between the black lines 201 having been read out are worked out. Also, the CPU 401 figures out the average of the intervals (i.e. average of the changes in the sub-scanning direction, in each of the first and second reference readout images). Furthermore, the CPU 401 works out (as a result of conversion) the average passing speeds of the document passing through the first and second readout positions 5 and 10, respectively, based on the average interval and the reading cycles of the respective CCDs 9 and 9'. In this manner, the average passing speeds of the document are figured out.

The ratio between the average passing speeds should be identical with the ratio between an inverse number of the reading cycle of the CCD 9 and an inverse number of the reading cycle of the CCD 9'. If the ratio between the inverse numbers of the reading cycles does not agree with the ratio between the passing speeds on account of, for example, the wear of the transportation roller 4, the difference between the ratios appears as the difference between the average interval in the first reference readout image and the average interval in the second reference readout image.

In the step S3 subsequent to the step S2, in order to cancel out the difference between the ratio of the inverse numbers of the reading cycles and the ratio of the passing speeds, the CPU 401 sets average reading cycles of the CCDs 9 and 9' of the first and second image reading sections X1 and X2, in reference to the average passing speeds at the times of passing through the first and second readout positions 5 and 10 (average of changes in the sub-scanning direction, in each of the first and second reference readout images), which have been worked out by the CPU 401 in the step S2.

For example, provided that the reading cycle of the CCD 9 of the first image reading section X1 is fixed to a predetermined value (T1), the reading cycle (T2) of the CCD 9' of the second image reading section X2 is worked out by the following equation (1), where V1 indicates the average passing speed at the time of passing through the first readout position 5, which has been detected in the step S2, V2 indicates the average passing speed at the time of passing through the second readout position 10, and the ratio V1/V2 indicates the ratio between the average interval of the black lines 201 in the first reference readout image and the average interval of the black lines 201 in the second reference readout image.

$$T2 = T1 \times V1/V2 \tag{1}$$

In this manner, the CPU 401 calculates the reading cycle of the second image reading section X2 (CCD 9'), and stores the calculation result in the RAM 403, as setting values of the respective reading cycles. The CPU 401 and the RAM 403 are an example of the reading cycle setting section.

In reference to the reading cycles having been set and stored, the first and second image reading sections X1 and X2 perform the image reading. As a result, it is possible to cause the magnification of the image read out by (the CCD 9 of) the first image reading section X1 (from the front side) and the magnification of the image read out by (the CCD 9' of) the second image reading section X2 (from the back side) to be identical with each other.

In the present embodiment, the reading cycle of the CCD 9' of the second image reading section X2 is set (changed). The present invention, however, is not limited to this arrangement. The reading cycle of the CCD 9 of the first image reading section X1 may be set (changed), or both the reading cycles of the CCD 9 and the CCD 9' may be set (changed).

In the present embodiment, the reference image is stripes drawn at regular intervals. The reference image, however, is not limited to the above. As long as the passing speeds of the document at the times of passing through the respective readout positions 5 and 10 are determined in reference to the reference image, any types of images can be used as the reference image. For example, it is possible to use a reference image in which an image property, e.g. a shape extending in the main scanning direction, color, and density, changes periodically or serially in the sub-scanning direction.

Figure 7:
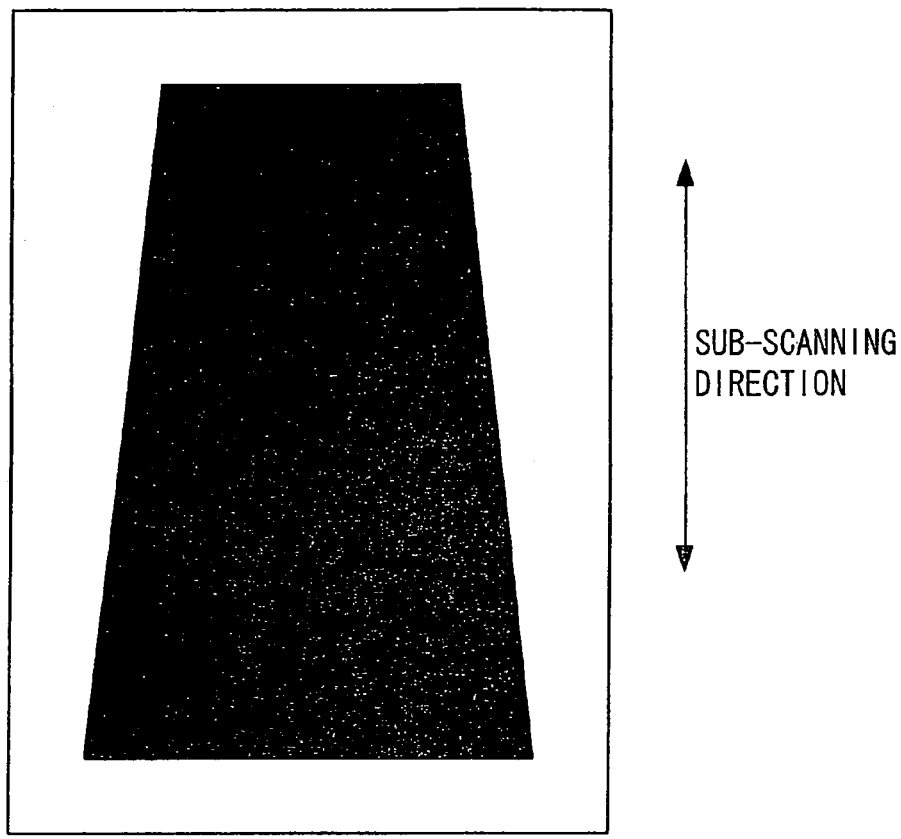
FIG. 7 shows another example of the reference to be read out by the image reading apparatus of the embodiment of the present invention.

FIG. 7 shows another example of a reference document on which a reference image is formed. In the trapezoidal reference image shown in FIG. 7, the black portions serially change in thickness in the sub-scanning direction which is in parallel to the direction of the transportation of the document. Therefore, in an image read out from the reference image, the rate of change of the black portions in terms of thickness in the sub-scanning direction (i.e. length in the main scanning direction) can be regarded as the passing speed of the document at a readout position.

In the present embodiment, the average passing speeds of the document at the first and second readout positions 5 and 10, respectively, are worked out, and based on the passing speeds thus worked out, the average reading cycles of the CCDs 9 and 9' are determined. The present invention, however, is not limited to this embodiment.

The document is accelerated on the transportation path 3 at multiple stages. The document is accelerated at the time of passing through the first readout position 5, and also at the time of passing through the second readout position 10. Therefore, in accordance with the multiple-stage acceleration, the reading cycle of the first image reading section X1

(CCD 9) and the reading cycle of the second reading cycle X2 (CCD 9') may be varied more than once, while the document is transported.

For example, assume that the document is transported only by the transportation rollers 4a when the document reaches the first readout position 5, and the document is transported only by the transportation rollers 4b when the document has just passed through the second readout position 10. Also, assume that the document is transported only by the transported rollers 4b when the document reaches the second readout position 10, and the document is transported only by the transportation rollers 4c when the document has just passed through they second readout position 10.

In this case, the document passing through the first readout position 5 is accelerated at three stages. That is, the document passing through the first readout position 5 is accelerated at the following three stages: first stage where the document is transported only by the transportation rollers 4a; second stage where the document is transported by the transportation rollers 4a and 4b; and third stage where the document is transported only by the transportation rollers 4b. It is noted that the document is accelerated at three stages also at the time of passing through the second readout position 10.

The changes of speed at the first, second, and third stages are reflected in the first reference image (an image read out from the reference image shown in FIG. 2) read out by the first image reading section X1. (In other words, the intervals between the black lines 201 change at the first, second, and third stage.) On this account, the CPU 401 (see FIG. 4) can detect the changes in the speed at each of the first, second, and third stages (multiple stages), by performing calculations (pattern recognition and analysis).

Figure 8:
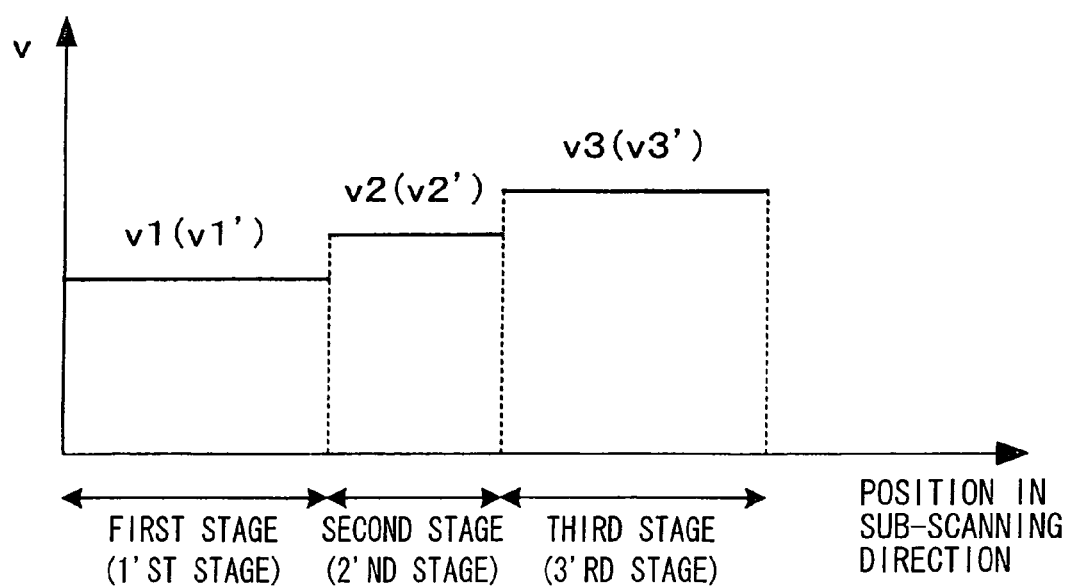
FIG. 8 is a graph showing how the passing speed of the document changes at the image readout positions.

The aforesaid three-stage changes in speed are represented in a graph shown in FIG. 8, in which the passing speed of the document changes stepwise.

In a similar manner, in reference to the second reference image which is obtained by the second image reading section X2 when the document passes through the second readout position 10, the three-stage changes in speed (1'st stage, 2'nd stage, and 3'rd stage) as shown in FIG. 8 are detected.

Referring to the three stages of speed obtained from the first reference readout image and the three stages of speed obtained from the second reference readout image, it is possible to set the reading cycles of the transported document, which correspond to those stages.

For example, provided that the reading cycle of the CCD 9 of the first image reading section X1, at the first stage, is fixed to a certain value, the reading cycles of the CCD 9 at the second and third stages and the reading cycles of the CCD 9' at the 1'st stage, 2'nd stage, and 3'rd stage are calculated by the above-described equation (1), in a manner similar to the step S3 which is described above and shown in FIG. 5. The calculation results are stored in the RAM 403, as a table showing the relations of the stages and the setting values of the reading cycles.

Figure 9:
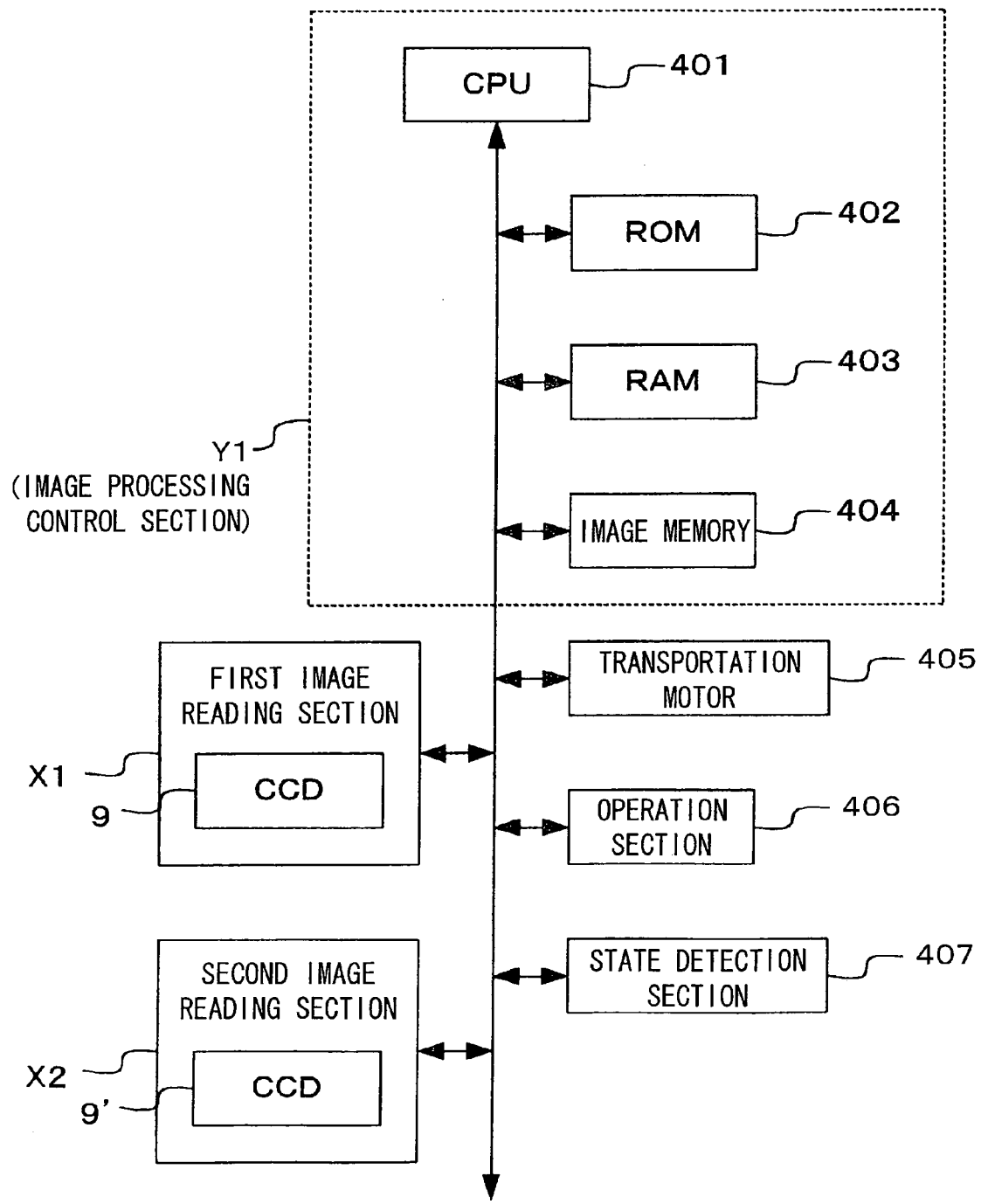
FIG. 9 shows another example of the block diagram showing the essential part of the image reading apparatus of the embodiment of the present invention.

FIG. 9 is a block diagram showing the essential part of the scanner A of the present embodiment, in a case where the reading cycles of the CCDs 9 and 9' are set for multiple stages.

As shown in the figure, the image processing control section Y1 of the scanner A is connected to a state detection section 407 that detects in what manner the document contacts the transportation rollers 4a-4c while being transported on the transportation path 3, i.e. detects the first to third stages and the 1'st to 3'rd stages.

The state detection section 407 is composed of members such as sensors that detect the document and that are provided around the transportation rollers 4a-4c, respectively. The state detection section 407 detects in what state the transportation of the document lies, first stage, second stage, third stage, 1'st stage, 2'nd stage, or 3'rd stage.

While the document is transported, the CPU 401 determines in which one of the stages (the first to third stages and the 1'st to 3'rd stages) the document lies, in reference to the results of the detection by the state detection section 407. Every time the switching of the state is detected, the reading cycles of the CCD 9 and the CCD 9' are switched to the stored values, in reference to the table stored in the RAM 403.

Because of the above, after the magnification of the image read out by the first image reading section X1 and the magnification of the image read out by the second image reading section X2 are caused to be identical with each other, the magnifications are equalized in accordance with the stages of the speed, in each of the images read out by the first and second image reading sections X1 and X2. This further improves the quality of the images.

The scanner A of the present embodiment includes members such as a CPU 401 that executes a control program that realizes the aforesaid functions, a ROM 402 that stores the program, a RAM 403 that functions as a workplace where the program is run, and a storage device (storage medium) such as an image memory 404 in which obtained image data is stored. Therefore, the object of the present invention is achieved by: (i) providing, in the image reading apparatus, a storage medium in which a computer-readable program code (executable program, intermediate code program, a source program) of an image reading program that is software for realizing the aforesaid functions is stored, and (ii) causing a computer (CPU, MPU) to read out and execute the program code stored in the storage medium.

Examples of such a storage medium include a tape, such as a magnetic tape and a cassette tape; a magnetic disk, such as a flexible disk and a hard disk; a disc, such as a CD-ROM/MO/MD/DVD/CD-R; a card, such as an IC card (inclusive of a memory card) and an optical card; and a semiconductor memory, such as a mask ROM, an EPROM, an EEPROM, or a flash ROM.

The scanner A may be connectable to a communication network so that the program code is supplied to the scanner A via the communication network. The communication network is not particularly limited. Specific examples thereof are: the Internet, intranet, extranet, LAN, ISDN, VAN, CATV (cable TV) communication network, virtual private network, telephone network, mobile communication network, satellite communication network, and the like. Further, the transmission medium (channel) constituting the communication network is not particularly limited. Specific examples thereof are: (i) a wired channel using an IEEE1394, a USB, a power-line communication, a cable TV line, a telephone line, a ADSL line, or the like; or (ii) a wireless channel using IrDA, infrared rays used for a remote controller, Bluetooth®, IEEE802.11, HDR, a mobile phone network, a satellite connection, a terrestrial digital network, or the like. The present invention may be realized as a computer data signal (data signal array) which realizes the program code by electronic transmission and which is embedded in a carrier wave.

The functions executed by the CPU of the present embodiment are not necessarily realized by software. The functions may be realized by hardware logic.

As described above, the image reading apparatus of the present invention includes: a transportation section that transports a document on a predetermined transportation path; a first image reading section that reads out an image from one surface of the document transported on the transportation path; a second image reading section that reads out an image from the other surface of the document, at a position which is lower, in terms of a document transportation direction, than an image readout position where the image is read out by the first image reading section; a speed detection section that detects a document transportation speed when the first image reading section reads out the image and a document transportation speed when the second image reading section reads out the image; and a reading cycle setting section that sets a reading cycle, in the document transportation direction, of the first image reading section and/or the second image reading section, in accordance with a result of detection by the speed detection section.

According to the arrangement above, in a case where, for example, the transportation section wears over time, the changes in the document transportation speed on account of the wear are detected by the speed detection section that detects the document transportation speed when the first image reading section reads out the image and the document transportation speed when the second image reading section reads out the image. In accordance with the result of the detection by the speed detection section, the reading cycle of the first image reading section and/or the second image reading section in the document transportation direction is set. That is, the reading cycle setting section sets (changes the setting of) the reading cycle of at least one of the first and second image reading sections, in such a manner as to reduce the relative difference between the magnification of the image read out by the first image reading section and the magnification of the image read out by the second image reading section. This allows the magnification of the image read out by the first image reading section and the magnification of the image read out by the second image reading section to be identical with each other, even if, for example, the transportation section wears over time.

In addition to the above, the image reading apparatus of the present invention may further include a reference readout image acquisition section that acquires (i) a first reference readout image which is read out by the first image reading section and (ii) a second reference readout image which is read out by the second image reading section, from a reference document which is being transported on the transportation path and which has surfaces on which reference images are formed, respectively, each of the reference images having an image property that periodically or serially changes in a sub-scanning direction in parallel to the document transportation direction, and in accordance with the image properties of the first and second reference readout images acquired by the reference readout image acquisition section, the speed detection section detects the document transportation speed when the first image reading section reads out the image and the document transportation speed when the second image reading section reads out the image.

Alternatively, the image reading apparatus of the present invention may include a transportation section that transports a document on a predetermined transportation path; a first image reading section that reads out an image from one surface of the document transported on the transportation path; a second image reading section that reads out an image from the other surface of the document, at a position which is lower, in terms of a document transportation direction, than an image readout position where the image is read out by the first image reading section, images on the reference document, which are formed on the respective surfaces of the document and each of which have an image property that periodically or serially changes in a sub-scanning direction in parallel to the document transportation direction, are read out by the first image reading section and the second reading section, and in accordance with the difference in the sub-scanning direction between the reference images thus read out, the document reading cycles (reading speeds) of the first and second image reading sections are set.

According to the arrangement above, in a case where, for example, the transportation section wears over time, the wear and the like is reflected in the reference image read out by the first image reading section (i.e. the first reference readout image) and the reference image read out by the second image reading section (i.e. the second reference readout image). As the reading cycle setting section compares the first reference readout image with the second reference readout image, the relative difference between the magnitudes of the images read out by the first and second image reading sections is determined. Based on the determination result, the reading cycle of at least one of the first and second image reading sections is set (changed) in such a manner as to reduce the aforesaid relative difference. This allows the magnification of the image read out by the first image reading section and the magnification of the image read out by the second image reading section to be identical with each other, even if, for example, the transportation section wears over time.

The above-described image reading apparatus may be arranged such that the reading cycle setting section (I) detects an average of changes, in the sub-scanning direction, in the image property of the first reference readout image and/or the second reference readout image, and (II) sets the reading cycle of the first image reading section and/or the second image reading section in the document transportation direction, in reference to the average of the changes.

The passing speed at the time of passing through the first image reading section and the passing speed at the time of passing through the second image reading section are changed in multiple stages, in accordance with the transportation state. The transportation state changes because of the following conditions: which transportation roller (transportation section) transports the document, and how many transportation rollers (transportation section) transport the document.

In the case above, the average of changes in the image property of each of the first and second reference readout images, which are read out by the first and second image reading sections, respectively, represents the average magnifications of the respective images read out by the first and second image reading sections. Therefore, in the arrangement above, the respective reading cycles of the first and second image reading sections are set in such a manner as to equalize the average magnifications of the respective images read out by the first and second image reading sections. This makes it possible to equalize the magnitudes of the respective images read out by the first and second image reading sections.

The above-described image reading apparatus may be arranged such that the reading cycle setting section (I) detects multiple-stage changes, in the sub-scanning direction, in the image property of the first reference readout image and/or the second reference readout image, and (II) sets multiple-stage reading cycles of the first image reading section and/or the second image reading section in the document transportation direction, in reference to the multiple-stage changes.

According to the arrangement above, in a case where the transportation state changes in multiple stages, the reading cycles of the first and second image reading sections are set also in multiple stages. Therefore, after the magnification of the image read out by the first image reading section and the magnification of the image read out by the second image reading section are caused to be identical with each other, the magnifications are equalized in accordance with the stages, in each of the images read out by the first and second image reading sections. This further improves the quality of the images.

The above-described image reading apparatus may be arranged such that, each of the reference images on the reference document is a striped pattern in which figures are provided at predetermined intervals, in the sub-scanning direction, and based on the intervals between the figures in the sub-scanning direction, the speed detection section detects the document transportation speed when the first image reading section reads out the image and the document transportation speed when the second image reading section reads out the image.

According to the arrangement above, based on the intervals between the figures in the sub-scanning direction, the document transportation speed when the first image reading section reads out the image and the document transportation speed when the second image reading section reads out the image are detected. The above-described intervals are preferably about half as much as the resolution of the image reading performed by each of the first and second image reading sections.

The above-described image reading apparatus may be arranged such that, each of the reference images on the reference document is an image in which figures extending in a main scanning direction orthogonal to the sub-scanning direction change in width, along the sub-scanning direction, and in accordance with widths of figures, which extend in the main-scanning direction, in the first reference readout image and the second reference readout image acquired by the reference readout image acquisition section, the speed detection section detects the document transportation speed when the first image reading section reads out the image and the document transportation speed when the second image reading section reads out the image.

According to the arrangement above, in accordance with the widths of the figures, which extend in the main-scanning direction, in the first reference readout image and the second reference readout image, the document transportation speed when the first image reading section reads out the image and the document transportation speed when the second image reading section reads out the image are detected.

The above-described image reading apparatus may be arranged such that, each of the reference images on the reference document is an image whose color changes along the sub-scanning direction, and in accordance with changes in color in the sub-scanning direction in the first reference readout image and the second reference readout image acquired by the reference readout image acquisition section, the speed detection section detects the document transportation speed when the first image reading section reads out the image and the document transportation speed when the second image reading section reads out the image.

According to the arrangement above, in accordance with the changes in color of the first and second reference readout images in the sub-scanning direction, the document transportation speed when the first image reading section reads out the image and the document transportation speed when the second image reading section reads out the image are detected.

The above-described image reading apparatus may be arranged such that, each of the reference images on the reference document is an image whose density changes along the sub-scanning direction, and in accordance with changes in density, in the sub-scanning direction, in the first reference readout image and the second reference readout image acquired by the reference readout image acquisition section, the speed detection section detects the document transportation speed when the first image reading section reads out the image and the document transportation speed when the second image reading section reads out the image.

According to the arrangement above, in accordance with the changes in densities of the first and second reference readout images in the sub-scanning direction, the document transportation speed when the first image reading section reads out the image and the document transportation speed when the second image reading section reads out the image are detected.

The above-described image reading apparatus may be arranged such that, the speed detection section includes sensors that are provided along the transportation path and that detect the document transportation speeds.

An image reading method of the present invention includes the steps of: (i) transporting a document on a predetermined transportation path; (ii) reading out an image from one surface of the document transported on the transportation path; (iii) reading out an image from the other surface of the document, at a position which is lower, in terms of a document transportation direction, than an image readout position where the image is read out in the step (i); (iv) detecting a document transportation speed when the image is read out in the step (i) and a document transportation speed when the image is read out in the step (ii); and (v) in accordance with a result of detection in the step (iv), setting a reading cycle in the step (i) and/or the step (ii), in the document transportation direction.

According to the arrangement above, in a case where, for example, the transportation means by which the document is transported wears over time, the changes in the document transportation speeds on account of the wear are detected in the step (iv) in which the document transportation speed when the image is read out in the step (i) and the document transportation speed when the image is read out in the step (ii) are detected. Then, in the step (v), the reading cycle in the document transportation direction in the step (i) and/or in the step (ii) is set. This allows the magnification of the image read out by the first image reading section and the magnification of the image read out by the second image reading section to be identical with each other, even if, for example, the transportation section wears over time.

The image reading apparatus may be realized by a computer. In such a case, the scope of the present invention encompasses the following ones: an image reading program that realizes the image reading apparatus by a computer, by causing the computer to function as the reading cycle setting section or as the speed detection section and the reading cycle setting section; a series of data signals representing the image reading program; and a computer-readable storage medium that stores the program.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An image reading apparatus, comprising:
a transportation section for transporting a document on a predetermined transportation path;
a first image reading section for reading out image from a first surface of the document transported on the predetermined transportation path;

a second image reading section for reading out an image from a second surface of the document, at a position lower in a document transportation direction, relative to an image readout position where the image is read out by the first-image reading section;

a speed detection section connected to the first and second image reading sections that detects a first document transportation speed when the first image reading section reads out the image, and a second document transportation speed when the second image reading section reads out the image;

a reading cycle setting section connected to the speed detection section that sets a reading cycle, in the document transportation direction, of the first image reading section and/or the second image reading section, in accordance with a result of detection by the speed detection section; and a reference readout image acquisition section that acquires:

(i) a first reference readout image which is read out by the first image reading section; and (ii) a second reference readout image which is read out by the second image reading section, from a reference document which is being transported on the transportation path and which has surfaces on which reference images are formed, respectively, wherein each of the reference images having have an image property that periodically or serially changes in a sub-scanning direction in parallel to the document transportation direction, in accordance with the image properties of the first and second reference readout images acquired by the reference readout image acquisition section; and the speed detection section detecting the document transportation speed when the first image reading section reads out the image and the document transportation speed when the second image reading section reads out the image.

2. The image reading apparatus as defined in claim 1, wherein, the reading cycle setting section:

(i) detects an average of changes, in the sub-scanning direction, in the image property of the first reference readout image and/or the second reference readout image, and (ii) sets the reading cycle of the first image reading section and/or the second image reading section in the document transportation direction, in reference to the average of the changes.

3. The image reading apparatus as defined in claim 1, wherein, the reading cycle setting section:

(i) detects multiple-stage changes, in the sub-scanning direction, in the image property of the first reference readout image and/or the second reference readout image, and (ii) sets multiple-stage reading cycles of the first image reading and/or the second image reading section in the document transportation direction, in reference to the multiple-stage changes.

4. The image reading apparatus as defined in claim 1, wherein, each of the reference images on the reference document is a striped pattern in which figures are provided at predetermined intervals, in the sub-scanning direction, and based on the intervals between the figures in the sub-scanning direction, and wherein the speed detection section detects the first document transportation speed when the first image reading section reads out the image and the second document transportation speed when the second image reading section reads out the image.

5. The image reading apparatus as defined in claim 1, wherein, each of the reference images on the reference document is an image in which figures extending in a main scanning directions, orthogonal to the sub-scanning direction, change in width, along the sub-scanning direction, and in accordance with widths of figures, which extend in the main-scanning direction, the first reference readout image and the second reference readout image are acquired by the reference readout image acquisition section, and wherein the speed detection section detects the document transportation speed when the first image reading section reads out the image and the document transportation speed when the second image reading section reads out the image.

6. The image reading apparatus as defined in claim 1, wherein, each of the reference images on the reference document is an image whose color changes along the sub-scanning direction, and in accordance with changes in color in the sub-scanning direction, the first reference readout image and the second reference readout image are acquired by the reference readout image acquisition section, and wherein the speed detection section detects the first document transportation speed when the first image reading section reads out the image and the second document transportation speed when the second image reading section reads out the image.

7. The image reading apparatus as defined in claim 1, wherein, each of the reference images on the reference document is an image whose density changes along the sub-scanning direction, and in accordance with changes in density, in the sub-scanning direction, the first reference readout image and the second reference readout image are acquired by the reference readout image acquisition section, and wherein the speed detection section detects the document transportation speed when the first image reading section reads out the image and the document transportation speed when the second image reading section reads out the image.

8. An image reading method, comprising the steps of:

(i) transporting a document on a predetermined transportation path;

(ii) reading out an image from one surface of the document transported on the transportation path;

(iii) reading out an image from the other surface of the document, at a position which is lower, in terms of a document transportation direction, than an image readout position where the image is read out in the step (i);

(iv) detecting a first document transportation speed when the image is read out in the step (i) and a second document transportation speed when the image is read out in the step (ii);

(v) in accordance with a result of detection in the step (iv), setting a reading cycle in the step (i) and/or the step (ii), in the document transportation direction; and (vi) providing a reference readout image acquisition section that acquires a first and second readout image, wherein the second readout image is read out during step (iii), from a reference document which is being transported on the predetermined transportation path and which has surfaces on which references images are formed, respectively.

9. A computer-readable medium encoded with computer-executable instructions for operating an image reading apparatus that includes:
a transportation section that transports a document on a predetermined transportation path;
a first image reading section that reads out an image from one surface of the document transported on the transportation path;
a second image reading section that reads out an image from the other surface of the document, at a position which is lower, in terms of a document transportation direction, than an image readout position where the image is read out by the first image reading section, the image reading program causing a computer to perform the steps of:
(i) detecting a first document transportation speed when the first image reading section reads out the image and a second document transportation speed when the second image reading section reads out the image; and
(ii) setting a reading cycle, in the document transportation direction, of the first image reading section and/or the second image reading section, in accordance with a result of detection in the step (i);
a reference readout image acquisition section that acquires:
(i) a first reference readout image which is read out by the first image reading section; and
(ii) a second reference readout image which is read out by the second image reading section, from a reference document which is being transported on the transportation path and which has surfaces on which reference images are formed, respectively,
wherein each of the reference images having have an image property that periodically or serially changes in a sub-scanning direction in parallel to the document transportation direction. in accordance with the image properties of the first and second reference readout images acquired by the reference readout image acquisition section; and
the speed detection section detecting the document transportation speed when the first image reading section reads out the image and the document transportation speed when the second image reading section reads out the image.

* * * * *